US006886070B2

(12) United States Patent
Stafford

(10) Patent No.: US 6,886,070 B2
(45) Date of Patent: Apr. 26, 2005

(54) MULTIPLE USER INTERFACES FOR AN INTEGRATED FLASH DEVICE

(75) Inventor: William R. Stafford, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/927,252

(22) Filed: Aug. 10, 2001

(65) Prior Publication Data

US 2001/0049766 A1 Dec. 6, 2001

Related U.S. Application Data

(63) Continuation of application No. 09/293,576, filed on Apr. 16, 1999, now Pat. No. 6,330,635.

(51) Int. Cl.[7] .............................. G06F 12/02
(52) U.S. Cl. ................... 711/103; 714/718; 326/41; 345/519; 345/520; 345/533
(58) Field of Search ................. 711/103, 170; 365/51, 63, 200, 201, 189.02, 189.03, 230.02, 230.06, 181.02, 185.33; 326/41, 47, 37, 38, 39; 714/718; 345/519, 520, 533.554; 710/129

(56) References Cited

U.S. PATENT DOCUMENTS

| 5,802,559 | A |   | 9/1998  | Bailey |
| 5,815,427 | A | * | 9/1998  | Cloud et al. ................... 365/51 |
| 5,822,246 | A | * | 10/1998 | Taub et al. ............. 365/185.18 |
| 5,841,715 | A |   | 11/1998 | Farmwald et al. |
| 5,889,710 | A | * | 3/1999  | Pascucci ..................... 365/200 |
| 5,905,683 | A |   | 5/1999  | McClure |
| 6,021,469 | A | * | 2/2000  | Tremblay et al. ........... 711/125 |
| 6,031,782 | A | * | 2/2000  | Kobashi et al. ............. 365/228 |
| 6,037,803 | A | * | 3/2000  | Klein ........................... 326/86 |
| 6,125,423 | A | * | 9/2000  | Yamada ....................... 711/103 |
| 6,240,535 | B1 | * | 5/2001 | Farnworth et al. .......... 714/718 |

OTHER PUBLICATIONS

Carroll, M. and Boyd–Merritt, R., "Intel pushes graphics Integration, raises antitrust concerns," EE Times Online, posted Jul. 19, 1996 on www.eetimes.com, 4 pages.

Boyd–Merritt, R., and Carroll, M., "Intel's security plans raise fear from PC builders," EE Times Online, posted Dec. 12, 1998 on www.eetimes.com, 5 pages.

* cited by examiner

Primary Examiner—Mario Podmanabhan
Assistant Examiner—Jasmine Song
(74) Attorney, Agent, or Firm—Blakely, Sokoloff, Taylor & Zafman LLP

(57) ABSTRACT

A memory device having multiple interfaces is described. The memory device may be configured to operate with different interfaces using configuration circuitry in the device that enables switching between the multiple interfaces.

19 Claims, 6 Drawing Sheets

MULTIPLE USER INTERFACES FOR AN INTEGRATED FLASH DEVICE

This is a continuation of application Ser. No. 09/293,576, filed Apr. 16, 1999 now U.S. Pat. No. 6,330,635.

FIELD OF THE INVENTION

This invention relates to the field of integrated circuits and, more specifically, to interfaces for integrated circuits.

BACKGROUND

The motherboard is the main circuit board inside a computer which holds the processor, memory, and expansion slots and connects directly or indirectly to every part of the computer. The motherboard contains a control chipset, a memory device storing code, and the various buses used to link the motherboard components.

Typically, the memory on a motherboard is a Basic Input Output System (BIOS) memory component. BIOS consists of low-level code in a memory component that enables communication between the computer's operating system and hardware, including peripheral technologies. The BIOS also provides the initial instructions for power on self-test and booting system files. The BIOS component is tested by the memory manufacturer to verify compliance with specifications before shipment to the motherboard manufacturer. The motherboard manufacturer then programs the code into the BIOS component. The programming may be performed either before or after the BIOS component is mounted on the motherboard.

A BIOS must also be periodically updated to keep pace with new peripheral technologies. If the BIOS is stored on a read only memory (ROM) chip, it must be replaced. However, if the BIOS is stored on a programmable memory chip, it may be upgraded using software to reprogram the memory to be compatible with new peripheral technologies.

One prior art BIOS memory component is assembled in a package containing an additional set of pins that are dedicated for use with the programming function performed by the motherboard manufacturer. One problem with such a device is that the use of dedicated pins adds to the total pin count of the packaged device, thereby necessitating the use of a larger package. With the industry trend towards smaller system components, the use of a large package detracts from the desirability of a component.

Furthermore, with prior art BIOS memory components, a device interface specification must be provided to a motherboard manufacturer for programming the memory component. One problem with providing a device interface specification is that it may be undesirable to disclose a proprietary interface to the public.

SUMMARY OF THE INVENTION

A memory device including a plurality of device circuitry coupled to a plurality of device pads. The memory device also including an operation interface to operate the memory device in an operation mode and a plurality of interfaces to operate the memory device in a plurality of other modes. Each interface of the plurality of interfaces having a predetermined correlation between the plurality of device circuitry and the plurality of device pads. The memory device may also include a configuration circuit to select among the operation interface and the plurality of interfaces.

Additional features and advantages of the present invention will be apparent from the accompanying drawings and from the detailed description that follows.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

A memory device having multiple interfaces is described. The memory device may be configured to operate with different interfaces by using selection circuitry to switch device circuitry connected to device pads. For one of the embodiments, the memory device includes a test interface to test the memory device for defects, a programming interface to program the memory device with a code, and an operation interface to operate the memory device in a computer system. The use of multiple interfaces may reduce the pin count of the packaged memory device by providing for the use of existing device pads to program the memory device. A reduced pin count may also allow for integration of non-memory logic functions, for example, general purpose input pins.

Figure 1:
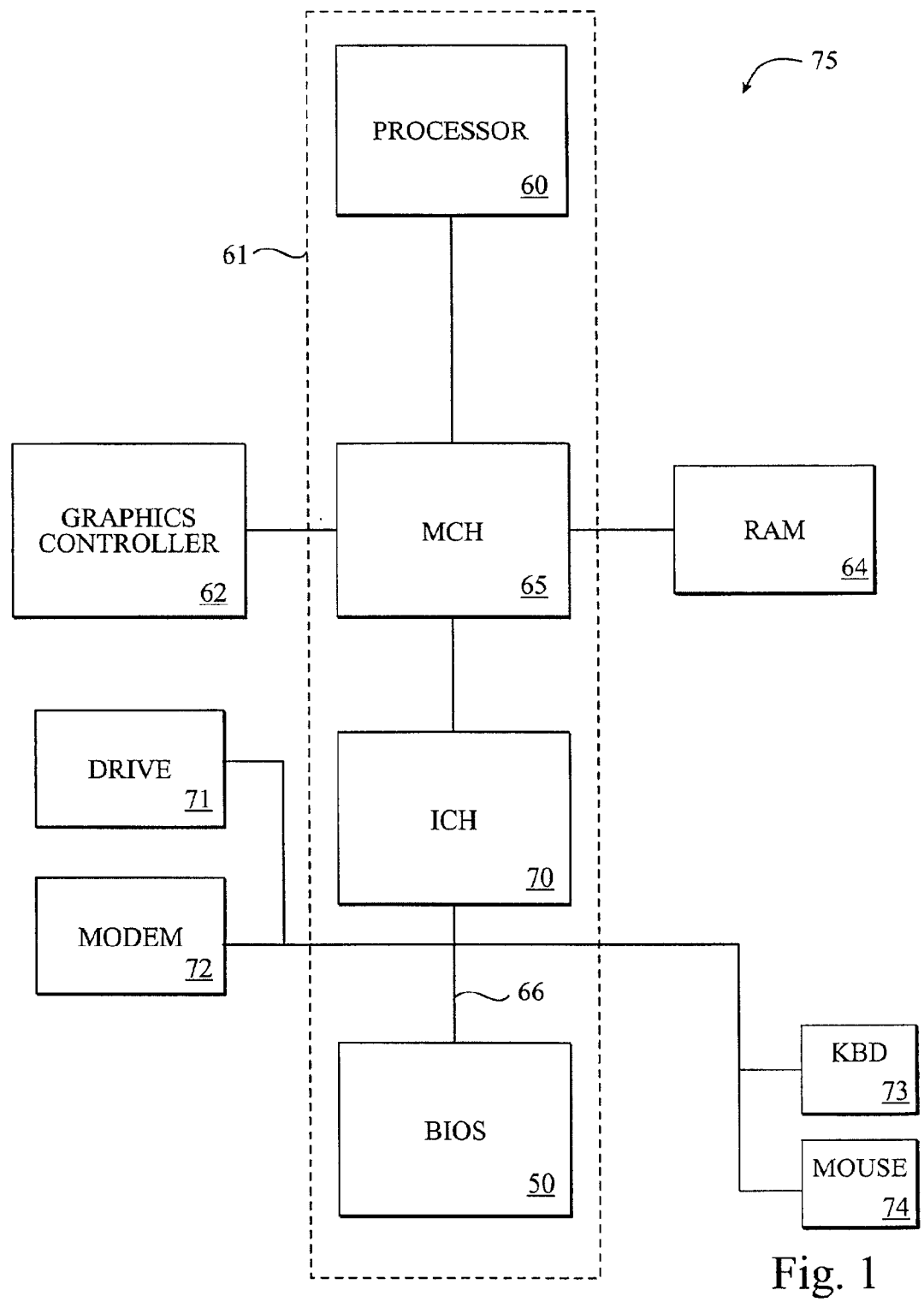
FIG. 1 illustrates one embodiment of a computer system containing a memory component having multiple interfaces.

FIG. 1 illustrates one embodiment of a computer system containing a memory component having multiple interfaces. Computer system 75 includes a processor 60, a memory control hub (MCH) 65, an input/output control hub (ICH) 70, and a memory 50. In one embodiment, memory 50 is a BIOS memory component residing on motherboard 61. In another embodiment, memory 50 may reside on other system boards.

The MCH 65 controls operations between processor 60 and memory devices, for examples, a graphics controller 62 and a random access memory (RAM) 64. The ICH 70 controls operations between processor 60 and input/output (I/O) devices, for examples, a keyboard (KBD) 73 and a mouse 74. The ICH 70 also controls operations between processor 60 and peripheral devices, for example, a drive 71 and a modem 72. In another embodiment, the MCH 65 and the ICH 70 may be integrated into a single component.

Computer system 75 requires an operating system in order to function. The operating system may be stored on a drive of computer system 75, for example, drive 71. In order for the operating system to function, the components on motherboard 61 must be configured to communicate with the different computer system components. In one embodiment, memory 50 contains firmware that is used for this configuration. In one embodiment, the firmware of memory 50 consists of low-level code that enables communication between the computer's operating system and hardware, for example, modem 72.

In one embodiment, memory 50 is a BIOS memory component coupled to a low level bus 66 of computer system 75. The performance of this bus may be low because the firmware is only required to be loaded once, when the computer system 75 is started. When the computer system 75 boots (i.e., is started), a code is fetched from the BIOS memory 50 and placed into the computer system's 75 random access memory 64. The code is executed by the BIOS to load the operating system of computer system 75 in processor 60.

In one embodiment, the memory 50 is a non-volatile memory, for example, a flash memory, having multiple interfaces that may be selected using configuration circuitry. A nonvolatile memory retains the contents of data stored within it even after power to the memory is removed. In another embodiment, the device may be other types of programmable memory devices, for examples, PROMs and EPROMs, having multiple interfaces.

In another embodiment, memory 50 is a firmware hub (FWH) component containing multiple interfaces. A firmware hub is a flash memory component with BIOS functions and security features, containing dedicated software stored in the memory section of the component. The FWH may be an integrated component of a hub chipset. In an alternative embodiment, memory 50 is not limited to use in personal computer systems, but may also be used in other types of data systems, for example, keyboard controllers, network hubs, switchers, and workstations.

Figure 2:
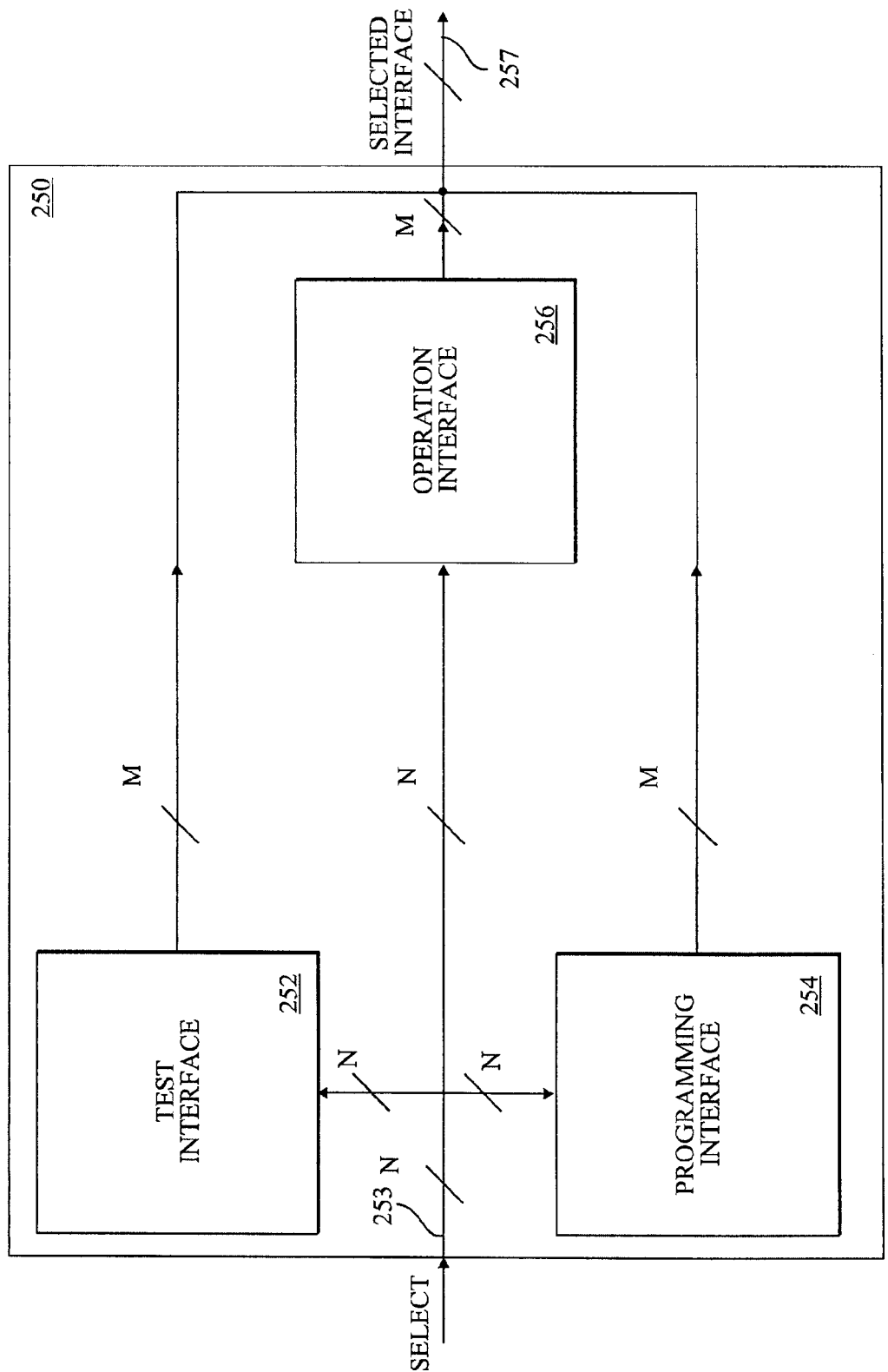
FIG. 2 illustrates one embodiment of a memory device having multiple interfaces.

FIG. 2 illustrates one embodiment of a memory device having multiple interfaces. A particular interface may be selected by toggling N configuration lines 253 within BIOS 250, with each interface having M input/output pads 257. In one embodiment, all the interfaces utilize the same I/O pads on the memory device, thereby reducing the size of the memory device. Each I/O pad may be selectively coupled to different circuitry within the memory device. While one interface is in use, the other interfaces coupled to other device circuitry are disabled.

In one embodiment, BIOS 250 includes two configuration lines 253 selecting from among three interfaces: a test interface 252, a programming interface 254, and an operation interface 256. The use of three interfaces allows for the same device to be accessed through either one of three different modes, for examples, a testing mode, a programming mode, and an operation mode. In another embodiment, BIOS 250 may contain more or less than three interfaces that may be selected by more or less than two configuration lines. In one embodiment, one of the interfaces is only accessible in the test mode and, thus, is prevented from being accessed in other modes by not connecting one of the configuration lines to an external pin when the memory device is packaged.

The interface I/O pads in the following figures are positioned on two sides of the memory device only for ease of illustration, and the I/O pads connected to particular device circuitry may be positioned anywhere on the physical layout of the device. In one embodiment, the I/O pads are positioned on all four sides of the device. The interfaces may have more or less than the number of device pads illustrated in the figures below.

Figure 3:
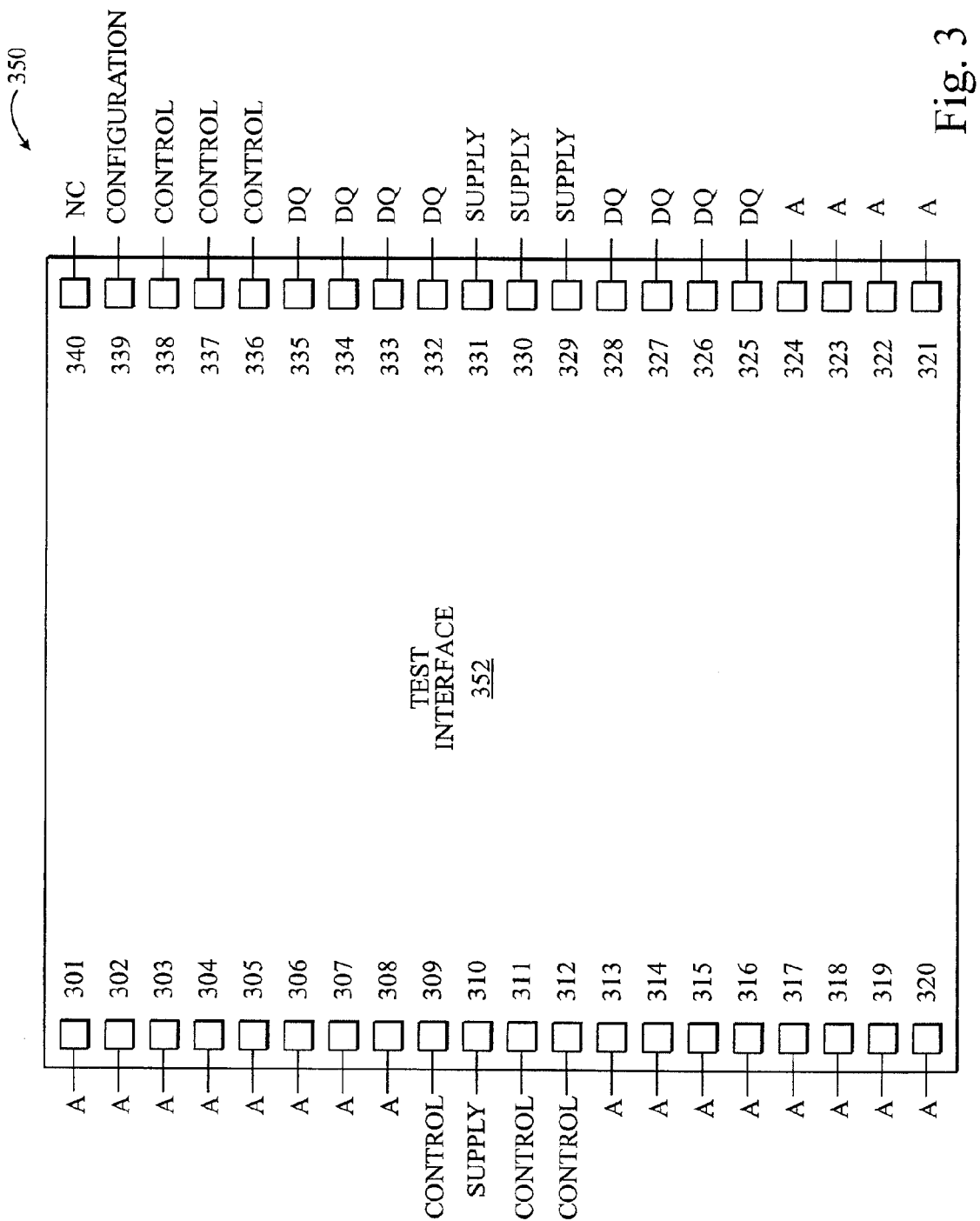
FIG. 3 illustrates one embodiment of an interface.

FIG. 3 illustrates one embodiment of an interface. In one embodiment, the memory device 350 is configured with a standard flash interface 352 for testing device functionality at wafersort. The standard flash interface 352 includes 20 address pads 301–308, and 313–324; control pads 309, 311–312, and 336–338; configuration pad 339; supply pads 310, and 329–331; data (DQ) pads 325–328, and 332–335; and no connect (NC) pad 340. The control pads 309, 311–312, and 336–339 are used for control operations of the memory device 350, for examples, chip enable, output enable, reset, and status. Configuration pad 339 is used to select between the test interface and the other interfaces used, for example, during the programming and operation modes of memory device 350. During wafersort testing at the component manufacturer, data is loaded into and read from the memory device 350 on data pads 325–328 to test for defects. The 20 pad address configuration allows for accessing the memory device 350 in one cycle because the address information can be loaded in parallel, thereby allowing data to be read on the same cycle.

In one embodiment, another one of the multiple interfaces has fewer than 20 address pads, thereby requiring two cycles to perform an addressing operation as discussed in further detail below. As such, use of the test interface at wafersort test may reduce test time by enabling addressing of the memory device 350 in a single cycle. In addition, a standard flash interface for testing purposes allows for use of existing test hardware and software, thereby maintaining tests costs with minimal added circuitry to the memory device 350.

Figure 4:
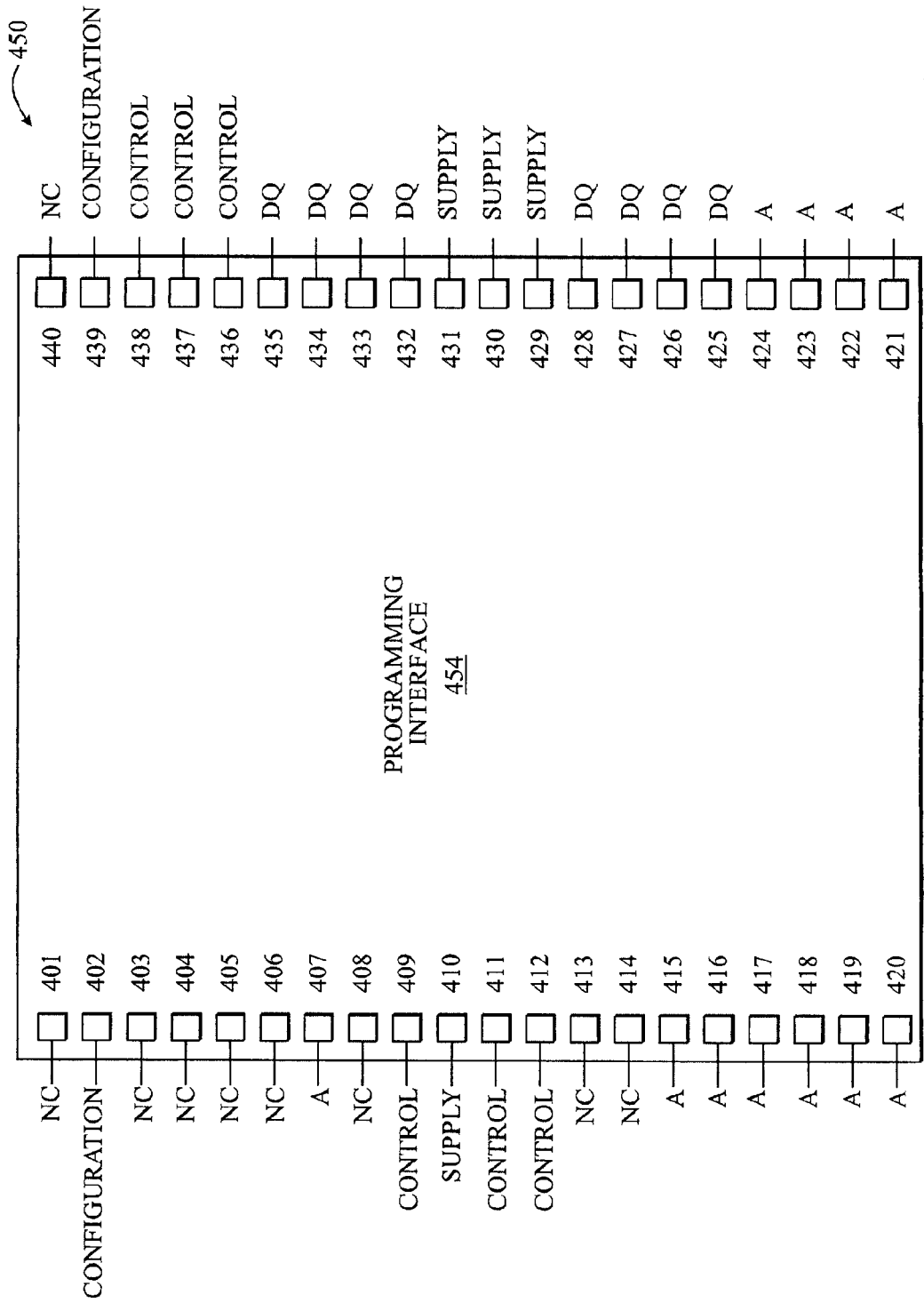
FIG. 4 illustrates another embodiment of an interface.

FIG. 4 illustrates one embodiment of another interface. In one embodiment, interface 454 is a programming interface that may be used in programming the memory device with firmware. As previously discussed, programming is performed after the memory device 350 is assembled into a package and ready for assembly onto the motherboard 61 of FIG. 1. During this time, memory device 450 is programmed with low level code to enable the startup of computer system 75 of FIG. 1. Configuration pad 402 is bonded out in the packaged memory device 450 for selecting between the programming interface 454 and another interface, for example, a test interface 352 of FIG. 3. In one embodiment, configuration pad 439 (used to select the test interface while in test mode) is not connected in the packaged memory device 450 as the test interface is no longer required.

Access to the memory device 450 when assembled in a package may be accomplished through the programming interface 454. In one embodiment, the programming interface 454 is no longer used after the computer system 75 of FIG. 1 is manufactured. In another embodiment, the programming interface may be used at a later time to reprogram the memory device 450 to operate with new technologies. Use of a programming interface 454 having a standard protocol may allow motherboard manufacturers to program the memory device 450 without requiring memory manufacturers to disclose a proprietary interface to motherboard manufacturers.

In one embodiment, the programming interface 454 is an Address/Address multiplexer (A/A mux) interface having 11 address pads, 407 and 415–424; control pads 409, 411, 412, and 436–438; configuration pads 402 and 439; supply pads 410 and 429–431; data pads (DQ) 425–428 and 432–435; and no connect (NC) pads 401, 403–406, 408, 413–414, and 440. Data pads 425–428 are used to transfer firmware code data into memory locations (not shown) of memory device 450. The firmware code is programmed into particular memory locations of memory device 450 using address pads 407 and 415–424. Memory data addressing and storage is well known in the art. Accordingly, a detailed description of the memory device's internal components and operation is not provided herein.

In one embodiment, memory locations within memory device 450 are addressed using 22 address locations defining a row and column position of a memory location. As such, in order to load a complete address using an A/A mux interface requires two cycles, as compared with one cycle using a standard flash interface. The low order address (row address: A0–A10) is loaded in the first cycle on the 11 address pads, 407 and 415–424, and the high order address (column address: A11–A21) is loaded in the second cycle using the same 11 address pads, 407 and 415–424.

The use of an interface 454 having half the number of address pads as a standard interface may allow the memory device 450 to be assembled in a smaller pin count package. In one embodiment, memory device 450 is assembled in a 32 pin plastic lead chip carrier (PLCC) package. In another embodiment, memory device 450 may be assembled in other packages having other pin counts, for example, a 40 pin thin small outline package (TSOP).

Although a second cycle is required to load the memory device with a full address, the A/A Mux interface 454 is suited for use in programming operations where the additional time of using two cycles may not significantly contribute to the total cycle time of programming operations. The memory device 450 features that are dropped off due to use of a smaller pin count package may include, for example, locking. Locking is a protection feature that prevents the memory device from being intentionally or inadvertently overwritten. Because the A/A mux interface 454 is usually used only for programming, the additional circuit logic for locking may not be required.

Figure 5:
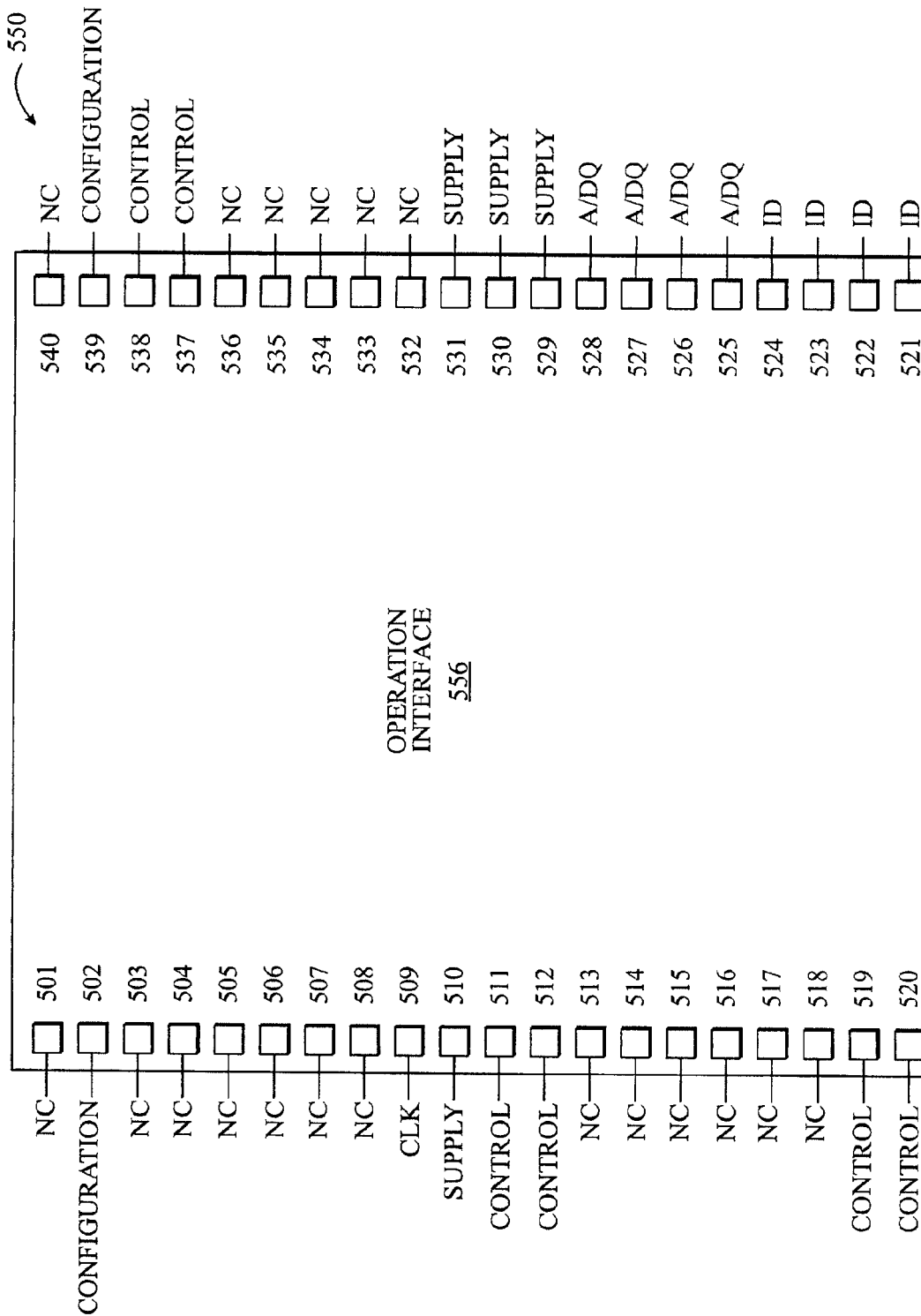
FIG. 5 illustrates yet another embodiment of an interface.

FIG. 5 illustrates yet another embodiment of an interface. In one embodiment, a third interface 556 is an operation interface. Operation interface 556 is used during operation of memory device 550 in computer system 75 on motherboard 61 of FIG. 1. Operation interface 556 includes multiplexed address/data (A/DQ) pads 525–528; configuration pads 502 and 539; supply pads 510 and 529–531; control pads 511–512, 519–520, and 537–538; identification (ID) pads 521–524; clock (CLK) pad 509; and no connect pads 501, 503–508, 513–518, 532–536, and 540. A/DQ pads 525–528 may be multiplexed to function as both address and data pads. CLK pad 509 may be used to synchronize timing operations of memory device 550 with other chipset components on motherboard 61 of FIG. 1.

Configuration pad 539 is used to select between the operation interface 556 and the programming interface 454 of FIG. 4. The configuration pad 539 is coupled to interface selection circuitry that functions to switch between different memory device circuitry that is coupled to a particular I/O pad. For example, a particular I/O pad connected to control circuitry during operation of the memory device may be switched to address circuitry when programming the device. As such, additional dedicated I/O pads are not needed for programming operations. This eliminates the need for a larger pin count package required when a memory device contains dedicated cads for programming operations.

In one embodiment, the operation interface is a proprietary interface. The use of a proprietary interface allows for use of a protocol that can be changed at will without requiring the added review time associated with a standard protocol. In one embodiment, operation interface 556 may not operate in standard flash applications.

A memory device having multiple interfaces enables use of a proprietary interface during device operation while allowing programming of the device through a programming interface that may be released to motherboard manufactures. Having separate interfaces allows a memory device manufacturer to withhold a device interface specification from tool enabling customers such as BIOS programmers.

Figure 6:
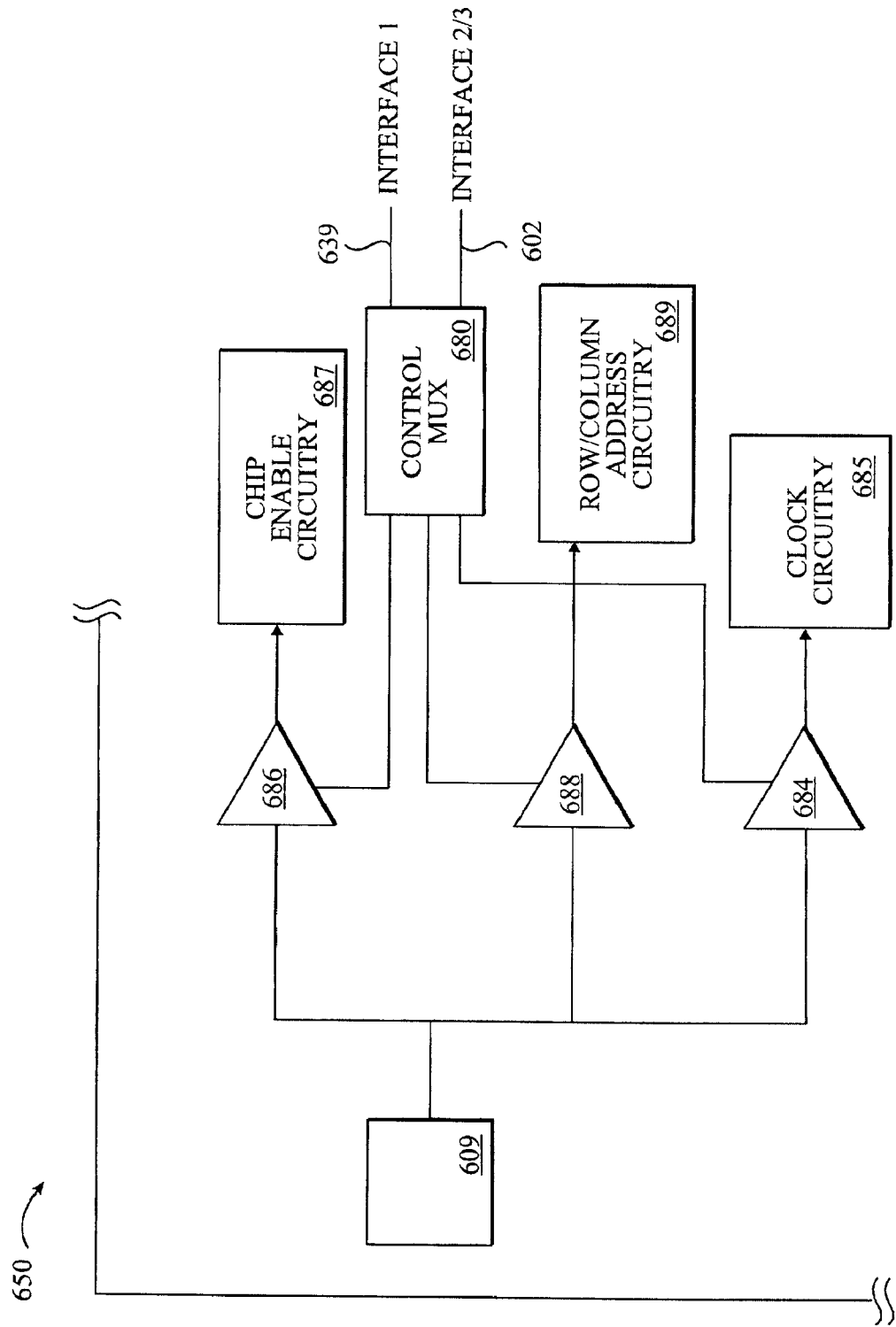
FIG. 6 illustrates one embodiment of interface selection circuitry.

FIG. 6 illustrates one embodiment of interface selection circuitry. Memory device 650 includes selection circuitry coupled to the pads of the device for switching between multiple device interfaces. In one embodiment, the selection circuitry coupled to pad 609, for example, includes control multiplexer 680 and drivers 684, 686, and 688. In one embodiment, drivers 684, 686, and 686 may be coupled to different control function circuitry within memory device 650. For example, driver 686 may be coupled to chip enable circuitry 687 used during testing; driver 688 may be coupled to row/column address selection circuitry 689 to toggle between a low and high order address during programming, and driver 686 may be coupled to clock circuitry 685 used during in system device operations. Two configuration lines 639 and 602 are coupled to control multiplexer 680 and used to select between the multiple interfaces containing the different device functions.

Drivers and multiplexers are well known in the art. Accordingly, a detailed description of their internal components and operation is not provided herein. The selection circuitry shown in FIG. 6 is only for illustrative purposes and other selection circuitry configurations may be used to select between the multiple device interfaces.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A memory device, comprising memory storage and three different interfaces to operate the memory storage in at least one of three different modes, wherein the memory storage and the three different interfaces reside in a common die.

2. The memory device of claim 1, wherein the three different interfaces comprise:
   a test interface to test the memory device for defects;
   a programming interface to program the memory device with a code; and
   an operation interface to operate the memory device in an operation mode.

3. The memory device of claim 2, further comprising selection circuitry to select among the plurality of different interfaces.

4. The memory device of claim 2, wherein the memory device is a flash memory and the test interface is a standard flash memory interface.

5. The memory device of claim 2, wherein the operation interface is a proprietary interface.

6. The memory device of claim 3, wherein the selection circuitry comprises:
   a plurality of drivers, each of the plurality of drivers coupled between a device pad and a device circuit, each of the plurality of drivers having a control input; and
   a multiplexer coupled to the control input of each of the plurality of drivers to select one of the plurality of drivers.

7. A component board, comprising:
   a processor; and
   a memory device coupled with the processor, the memory device comprising memory storage and three different interfaces to operate the memory storage in at least one of three different modes, where in the memory storage and the three different interfaces reside in a common die.

8. The component board of claim 7, further comprising selection circuitry to select among the three different interfaces.

9. The component board of claim 8, wherein the selection circuitry comprises:
a plurality of drivers, each of the plurality of drivers coupled between a device pad and a device circuit, each of the plurality of drivers having a control input; and
a multiplexer coupled to the control input of each of the plurality of drivers to select one of the plurality of drivers.

10. The component board of claim 7, wherein the three different interfaces comprise:
a test interface to test the memory device for defects;
a programming interface to program the memory device with a code; and
an operation interface to operate the memory device in an operation mode.

11. The component board of claim 10, wherein the memory device is a flash memory, the test interface is a standard flash memory interface, and the operation interface is a proprietary interface.

12. The component board of claim 8, wherein the memory device is a BIOS memory.

13. A computer system, comprising:
a peripheral device; and
a system board coupled to the peripheral device, the system board comprising:
a processor; and
a memory device coupled with the processor, the memory device comprising memory storage and three different interfaces to operate the memory storage in at least one of three different modes, where in the memory storage and the three different interfaces reside in a common die.

14. The computer system of claim 13, further comprising selection circuitry to select among the three different interfaces.

15. The computer system of claim 14, wherein the selection circuitry comprises:
a plurality of drivers, each of the plurality of drivers coupled between a device pad and a device circuit, each of the plurality of drivers having a control input; and
a multiplexer coupled to the control input of each of the plurality of drivers to select one of the plurality of drivers.

16. The computer system of claim 13, wherein the three different interfaces comprise:
a test interface to test the memory device for defects;
a programming interface to program the memory device with a code; and
an operation interface to operate the memory device in an operation mode.

17. The computer system of claim 16, wherein the memory device is a flash memory and the test interface is a standard flash memory interface and the operation interface is a proprietary interface.

18. The computer system of claim 14, wherein the memory device is a BIOS memory.

19. A memory device, comprising at least three different interfaces to operate the memory device in at least three different modes, wherein the memory device is a flash memory and wherein one of the at least three different interfaces is a standard flash memory interface.

* * * * *